C. SOLIE.
CIRCUIT CLOSER FOR AUTOMOBILE SIGNAL DEVICES.
APPLICATION FILED DEC. 19, 1918.
1,348,454.
Patented Aug. 3, 1920.
2 SHEETS—SHEET 1.
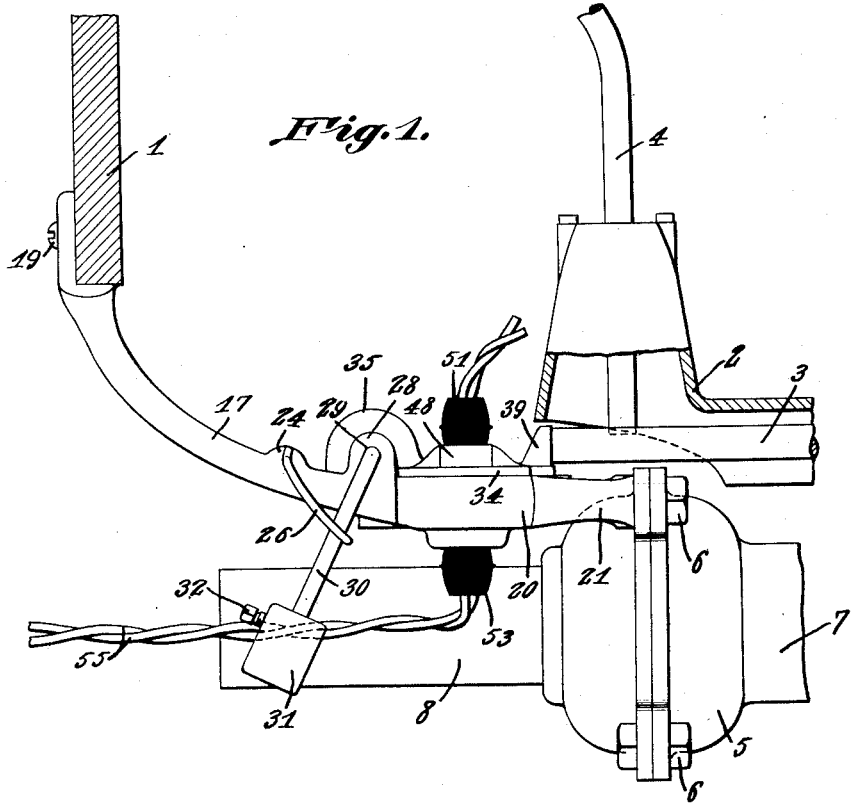
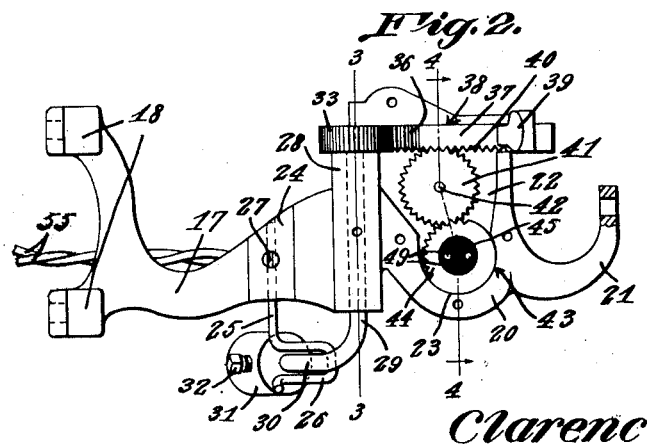
Clarence Solie, Inventor C. SOLIE.
CIRCUIT CLOSER FOR AUTOMOBILE SIGNAL DEVICES.
APPLICATION FILED DEC. 19, 1918.
1,348,454.
Patented Aug. 3, 1920.
2 SHEETS—SHEET 2.
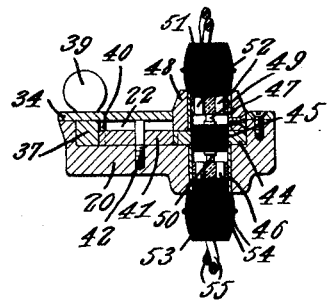
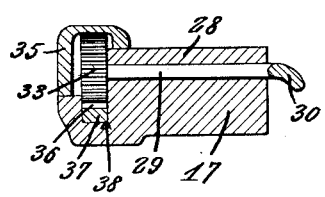
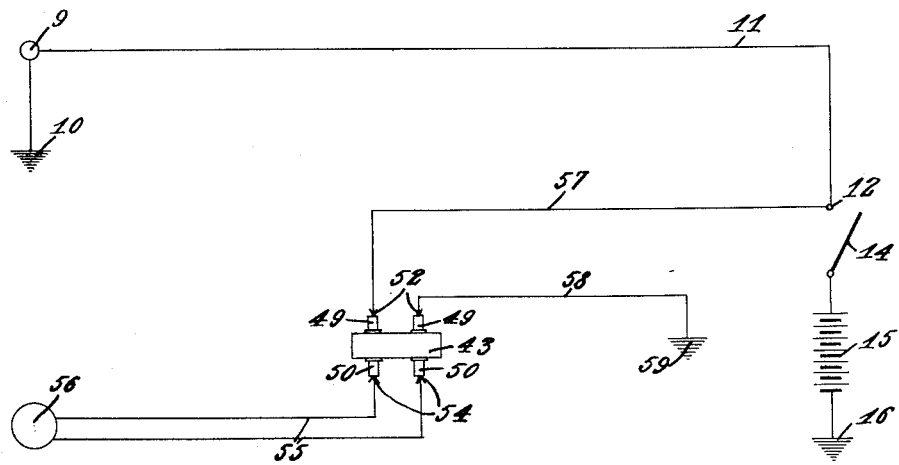
Clarence Solie, Inventor
Witness
By C. A. Snow & Co.
Attorneys

UNITED STATES PATENT OFFICE.

CLARENCE SOLIE, OF STANLEY, WISCONSIN.

CIRCUIT-CLOSER FOR AUTOMOBILE SIGNAL DEVICES.

1,348,454. Specification of Letters Patent. Patented Aug. 3, 1920.

Application filed December 19, 1918. Serial No. 267,515.

*To all whom it may concern:*

Be it known that I, CLARENCE SOLIE, a citizen of the United States, residing at Stanley, in the county of Chippewa and State of Wisconsin, have invented a new and useful Circuit-Closer for Automobile Signal Devices, of which the following is a specification.

This invention aims to provide novel means, operated by the gear-shifting lever of an automobile, for controlling a lamp at the rear of the automobile, the construction being such that, when the automobile is backed, a light differing from the one displayed when the vehicle is moving forwardly, will be shown.

Within the scope of what is claimed, a mechanic may make changes, without departing from the spirit of the invention.

In the drawings:—Figure 1 shows in side elevation, a device constructed in accordance with the invention, parts of the automobile appearing in section; Fig. 2 is a top plan of the bracket, the cover thereof being removed; Fig. 3 is a cross section on the line 3—3 of Fig. 2; Fig. 4 is a cross section on the line 4—4 of Fig. 2; Fig. 5 is a diagram illustrating operative but not mandatory circuits.

The numeral 1 denotes a part of an automobile, for instance, a portion of the front seat. At 2 there is shown a portion of a casing which may contain a gear-shifting means including a longitudinally slidable rod 3 controlled by a gear-shifting lever 4. The casing for the universal joint appears at 5, the parts of the casing being connected by securing elements 6. The engine shaft is denoted by the numeral 7, and the drive shaft is shown at 8. The numeral 9 marks the tail lamp (usually red) and this lamp may be wired up in any desired way. It may be grounded on one side as at 10, and be connected on its opposite side to a switch point 12 by a conductor 11, the switch point 12 coacting with a switch 14 on the dashboard of the vehicle, or elsewhere, the switch being connected to a battery 15 which may be grounded as at 16. The foregoing details are common in automobile construction, and no novelty is claimed for them, saving in so far as they may enter into combination with parts hereinafter described.

A bracket 17 is provided, the same including forks 18 attached at 19 to the part 1 of the automobile, the bracket comprising a broadened body 20 having an extension 21 connected by one of the securing elements 6 to the universal joint casing 5. There is a compartment 22 in the body 20 of the bracket 17, this compartment including an approximately circular part 23. The bracket 17 has a transverse boss 24 wherein the arm 25 of a depending loop-shaped stop 26 is rotatable for adjustment, there being a set screw 27 in the boss, which, engaging the arm 25, holds the stop 26 in adjusted positions. The bracket 17 is supplied with a transverse bearing 28 wherein a shaft 29 is mounted to rock, the shaft having a depending arm 30 on which a weight 31 is adjustable, the weight being held in place by a set screw 32. A pinion 33 is secured to one end of the shaft 29.

A cover 34 is mounted on the body 20 of the bracket, removably, and includes a shield 35 covering the pinion 33. The pinion 33 meshes into a rack 36 on the upper edge of a bar 37 mounted for right-line reciprocation in a groove or seat 38 formed in the body 20 of the bracket. A lug 39 is located on the forward end of the bar 37, in the path of the rod 3 which forms part of the gear-shifting means. The bar 37 is supplied with a side rack 40 meshing into a gear wheel 41 in the compartment 22, the gear wheel being journaled on a shaft 42 mounted in the body 20.

The numeral 43 denotes an oscillating switch located in the part 23 of the compartment 22 and including an interrupted pinion 44 meshing into the gear wheel 41 and carrying an insulating hub 45 journaled at one end in a sleeve 46 carried by the body 20 of the bracket, and journaled at its other end in a sleeve 47 carried by a block 48 mounted in the cover 34 and constituting a part thereof. The hub 45 carries upper terminals 49 and lower terminals 50, each terminal 49 coöperating with the terminal 50 therebelow, to establish a circuit through the hub. The terminals 49 and 50 may be spring-advanced in opposite directions, to secure a good contact, but since terminals operating as above described are known in the art, this portion of the structure has not been detailed. A top plug 51 is inserted into the sleeve 47 and is provided with contacts 52. A bottom plug 53 is inserted into the sleeve 46 and carries contacts 54. Conductors 55 lead from the contacts 54 to a lamp 56 on the rear end of the vehicle, this lamp, preferably, showing a white light of considerable intensity and adapted to illuminate the ground behind the vehicle. No specific means for mounting the lamp 56 has been shown, because the mounting means for the lamp will be governed by the construction of the automobile. From one contact 52, a conductor 57 leads to the switch point 12 and from the other contact 52 a conductor 58 may lead to a ground 59. These matters, however, being a matter of wiring.

When the lever 4 is operated to put the gear-shifting mechanism into reverse, thereby to cause the vehicle to back, the rod 3 engages the lug 39 and slides the bar 37 rearwardly, the rack 40 rotating the gear wheel 41 and the latter rotating the switch 43 by way of the pinion 44, until the terminals 49 engage the contacts 52, and until the terminals 50 engage the contacts 54, as shown in Figure 5. If the dash switch 14 is closed on the switch point, the red tail light 9 will be visible and, at the same time, the white lamp 56 will be lighted from the battery 15 by a circuit including the switch 14, the point 12, the conductor 57, one contact 52, one terminal 49, the corresponding terminal 50, the corresponding contact 54, the conductor 55, the other contact 54, the other terminal 50, the other terminal 49, the other contact 52, the conductor 58, and the ground 59. Thus, when the gear shift lever 4 is thrown into reverse position, but not otherwise, the lamp 56 will be lighted. When the gear shift lever 4 is so positioned that the vehicle is running forwardly in first speed, second speed or in high, the lamp 9 (red) only will be lighted, the circuit including the lamp 56 being open. When the rack bar 37 moves rearwardly, the rack 36, cooperating with the pinion 33, rotates the shaft 29 and causes the arm 30 to elevate the weight 31, the weight, the shaft 29 and the pinion 33 constituting means for advancing the bar 37 when the bar is no longer held back by the pressure of the part 3 on the lug 39, that is, in any position of the lever 4, saving the reverse position. When the bar 37 is advanced, the rack 40, the gear wheel 51 and the pinion 44 rotate the switch member 43 of which the pinion 44 constitutes a part, the circuit of the lamp 56 being opened. The arm 30 of the shaft 29 rests normally in the stop 26, and an adjustment of the position of the arm 30 may be brought about, by rotating the part 25 of the stop in the boss 24 and by tightening down the set screw 27, the pinion 33, the bar 37, and parts operatively connected therewith being adjusted accordingly.

I claim:—

1. In a circuit closer, a bracket; a shaft journaled in the bracket and provided with an eccentric weight; a pinion on the shaft; an oscillating switch journaled on the bracket and including a pinion; a rack bar slidable on the bracket and coacting with both pinions; and a gear shifting means, which closes the circuit, including a part coacting with the rack bar and acting in opposition to the weight which opens the circuit.

2. In a circuit closer, a bracket; a shaft journaled in the bracket; a pinion on the shaft; an oscillating switch journaled on the bracket and including a pinion; a rack bar slidable on the bracket and coacting with both pinions; mechanism under the control of an operator and cooperating with the rack bar to dispose the switch in closed circuit position; and normally inactive mechanical means connected with the shaft and rendered active by the operation of said mechanism to rotate the shaft and to dispose the switch in open circuit position.

3. In a circuit closer, a bracket; a shaft journaled in the bracket; a pinion on the shaft; an oscillating switch journaled on the bracket and including a pinion; a rack bar slidable on the bracket and cooperating with both pinions; an eccentric weight on the shaft and constituting means for rotating the shaft to dispose the switch in open circuit position; and means under the control of an operator coacting with the rack bar and acting in opposition to the weight to dispose the switch in closed circuit position.

In testimony that I claim the foregoing as my own, I have hereto affixed my signature in the presence of two witnesses.

CLARENCE SOLIE.

Witnesses:
C. B. AUBERTSON,
BERTHA CHRISTOPHERSON.